US007640834B2

(12) United States Patent
Morawiec et al.

(10) Patent No.: US 7,640,834 B2
(45) Date of Patent: Jan. 5, 2010

(54) SYSTEMS AND METHODS FOR TRIMMING ROLLS OF SHEET MATERIAL

(75) Inventors: Michael Morawiec, 225 Emerals Cove La., Woodstock, GA (US) 30189; James Van Gompel, Angola, IN (US)

(73) Assignee: Michael Morawiec, Woodstock, GA (US)

( * ) Notice: Subject to any disclaimer, the term of this patent is extended or adjusted under 35 U.S.C. 154(b) by 771 days.

(21) Appl. No.: 11/195,045

(22) Filed: Aug. 2, 2005

(65) Prior Publication Data

US 2007/0028732 A1 Feb. 8, 2007

(51) Int. Cl.
*B23B 5/14* (2006.01)

(52) U.S. Cl. .......... 82/47; 82/101

(58) Field of Classification Search .......... 82/47, 82/52, 59, 92, 101, 46, 70.2, 83; 83/54, 490, 83/648, 649, 13; *B23B 5/14*
See application file for complete search history.

(56) References Cited

U.S. PATENT DOCUMENTS 3,361,017 A * 1/1968 Baumgarten .......... 82/128
3,522,748 A * 8/1970 Treffner .......... 82/101
3,603,182 A * 9/1971 Jackman et al. .......... 82/113
3,933,090 A * 1/1976 Reynolds .......... 101/40.1
4,671,150 A * 6/1987 Harris .......... 83/49
4,691,600 A * 9/1987 Carlson et al. .......... 82/113
5,016,507 A * 5/1991 Riera et al. .......... 83/384
5,016,746 A * 5/1991 Gibbs .......... 198/499
5,214,988 A * 6/1993 Quigley .......... 82/48
5,220,858 A * 6/1993 Allen et al. .......... 83/880
5,345,682 A * 9/1994 Dubinsky et al. .......... 30/102
5,383,380 A * 1/1995 Sartori .......... 82/70.1
5,964,024 A 10/1999 Wallace .......... 29/558
6,269,719 B1 8/2001 Easton et al. .......... 83/54
6,516,694 B1 * 2/2003 Easton et al. .......... 83/54
7,243,582 B1 * 7/2007 Launius .......... 82/104
7,398,716 B2 * 7/2008 Quigley .......... 82/47

* cited by examiner

*Primary Examiner*—Boyer D Ashley
*Assistant Examiner*—Sara Addisu
(74) *Attorney, Agent, or Firm*—Thomas, Kayden, Horstemeyer & Risley, LLP

(57) ABSTRACT

Systems and methods for trimming a roll of sheet material are provided. A representative system incorporates a core anchor that is configured to be inserted into the hollow core of a roll of sheet material and removably secured therein. The system also includes a cutting tool rotatably attached to the core anchor. During trimming of a roll of sheet material to which the core anchor is secured, the core anchor rotates with the roll as the roll is rotated.

19 Claims, 9 Drawing Sheets

SYSTEMS AND METHODS FOR TRIMMING ROLLS OF SHEET MATERIAL

BACKGROUND

Various types of sheet material, such as paper, typically are provided in the form of rolls of sheet material. Such a roll of sheet material typically incorporates a hollow core about which the sheet material is tightly wound. At times, such a roll of sheet material can be over six feet in length, over several feet in diameter and over several thousand pounds in weight.

Rolls of sheet material typically are transported from a production facility, where the rolls are produced, to a manufacturing facility, where the rolls are loaded onto manufacturing equipment for manufacturing end products. Given that the rolls are cumbersome, some rolls tend to become damaged prior to use. Unfortunately, damaged rolls may cause problems. For example, if the sheet material is damaged, use of such a roll may result in lower quality end products. Therefore, it has become commonplace to trim damaged rolls so that the remaining undamaged portions of the rolls can be used.

Damaged rolls are trimmed in a variety of manners. For example, one manner is to ship the damaged rolls off-site to a location where the rolls are trimmed. Clearly, this manner involves the time and expense associated with transporting the rolls from and then back to the manufacturing facility. Thus, on-site trimming may be preferred.

One manner that accommodates on-site trimming involves positioning a roll of sheet material in a horizontal orientation. The roll is maintained in this orientation while a saw is moved around the perimeter of the stationary roll in order to remove the damaged portion of the roll. For instance, a system for trimming a roll of sheet material is disclosed in U.S. Pat. No. 6,269,719.

SUMMARY

Systems and methods for trimming a roll of sheet material are provided. An embodiment of such a system comprises a core anchor that is configured to be inserted into the hollow core of a roll of sheet material and removably secured therein. The system also comprises a cutting tool rotatably attached to the core anchor. During trimming of a roll of sheet material to which the core anchor is secured, the core anchor rotates with the roll as the roll is rotated.

Another embodiment of a system for trimming a roll of sheet material comprises a shaft, a guide and a cutting tool. The shaft includes a first portion and a second portion, with the first portion being configured to be inserted into the hollow core of a roll of sheet material and removably secured therein. The second portion is configured to protrude from the core. The guide is rotatably mounted to the second portion of the shaft, and the cutting tool is movably mounted to the guide. In this regard, movement of the cutting tool along the guide changes a distance between the cutting tool and the shaft. During trimming of a roll of sheet material to which the shaft is secured, the shaft rotates with the roll as the roll is rotated.

An embodiment of a method for trimming a roll of sheet material comprises: positioning a roll of sheet material in a substantially horizontal orientation; securing, within the hollow core of the roll, an end of a rotatable shaft, a cutting tool being rotatably attached to the shaft such that the cutting tool is rotatable, relative to the shaft, within a plane perpendicular to a longitudinal axis of the shaft; rotating the roll of sheet material while an end of the shaft is secured within the hollow core, such that the shaft rotates with the roll, while maintaining the roll in the substantially horizontal orientation; and cutting the sheet material with the cutting tool.

Other systems and methods will be or may become apparent to one with skill in the art upon examination of the following drawings and detailed description. It is intended that all such additional systems and methods be protected by the accompanying claims.

BRIEF DESCRIPTION OF THE DRAWINGS

The components in the drawings are not necessarily to scale relative to each other.

Like reference numerals designate corresponding parts throughout the several views.

DETAILED DESCRIPTION

Systems and methods for trimming rolls of sheet material are provided. In this regard, trimming is achieved while rotating the roll. Specifically, in some embodiments, the roll is rotated about its longitudinal axis while in a substantially horizontal orientation.

Movement of a cutting tool, which cuts the roll while the roll is being rotated, is substantially matched to that of the roll during trimming. Since a roll of sheet material rarely (if ever) is perfectly round, the end of the roll that is being trimmed tends to move in various directions as the roll is rotated. Thus, matching the movement potentially results in a superior trimming of the roll.

Matching the movement, i.e. the non-rotational movement, of the roll of sheet material to that of the cutting tool is accomplished by use of a core anchor. In particular, a core anchor is inserted into and secured within the hollow core of the roll of sheet material that is to be trimmed. The cutting tool is configured to move in some respects with the core anchor, as is described in detail below.

Figure 1:
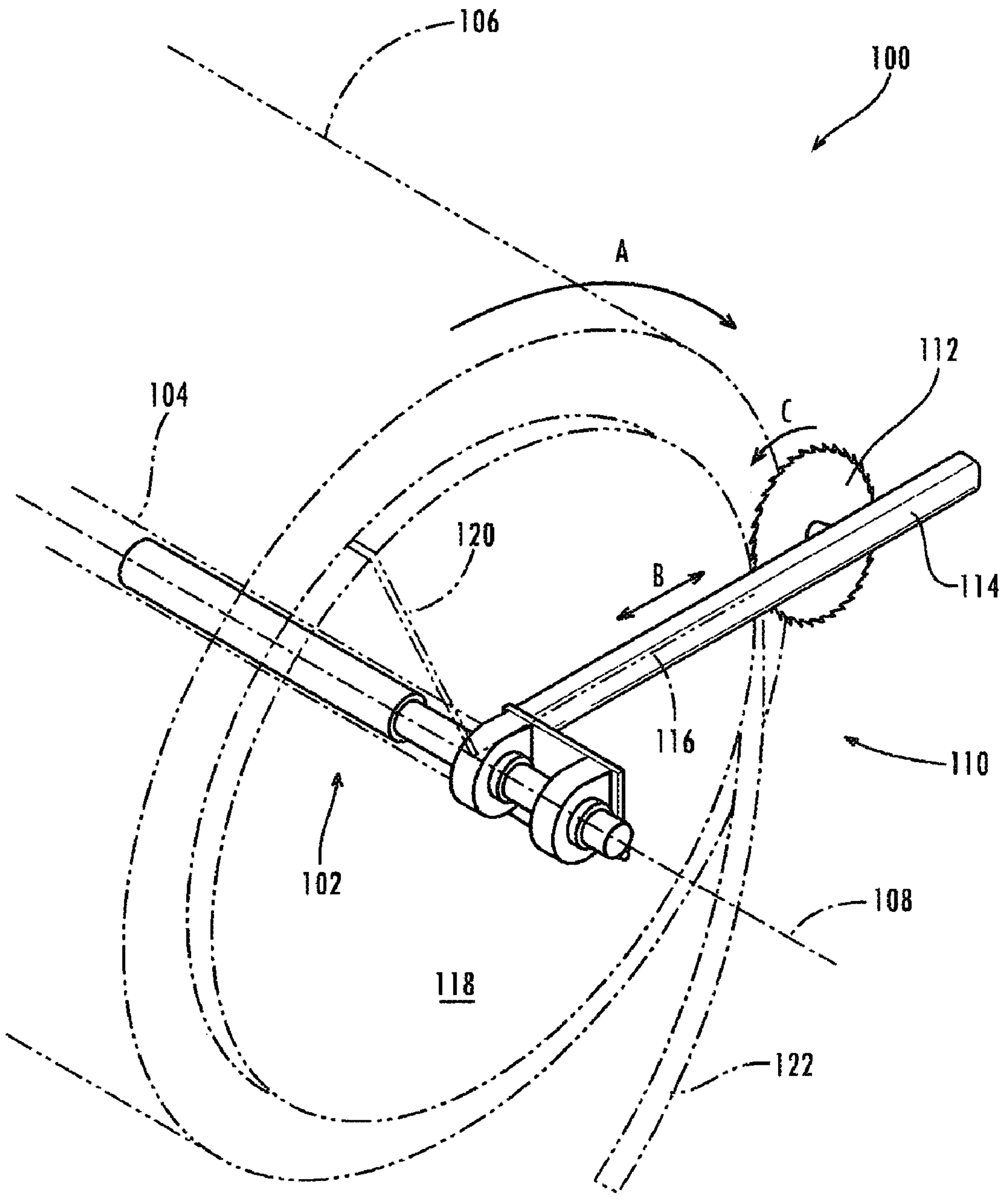
FIG. 1 is a schematic view of an embodiment of a system for trimming a roll of sheet material, with a representative roll of sheet material being shown in phantom lines.

Referring now to the drawings, FIG. 1 is a schematic view of an embodiment of a system for trimming a roll of sheet material. As shown in FIG. 1, system 100 comprises a core anchor 102 that is configured to be inserted within the hollow core 104 of a roll of sheet material 106. Specifically, the core anchor is configured to be removably secured within the hollow core so that, when the roll is rotated about its longitudinal axis 108 (indicated by arrow A), the core anchor rotates with the roll. A cutting tool 110 is adapted to rotatably engage the core anchor so that, as the core anchor rotates along with the roll, a position of the cutting tool can be substantially maintained.

In the embodiment of FIG. 1, the portion of the cutting tool 110 that actually cuts the sheet material, in this case a saw blade 112, is also configured to move relative to the core anchor. Specifically, the saw blade is able to move (indicated by arrow B) along a guide 114 (rotation of the saw blade is indicated by arrow C). Note also that rotation of the roll and the saw blade can be in either direction. Guide 114 generally restricts movement of the saw blade within a plane that is substantially perpendicular to the core anchor. For instance, when the core anchor is secured within the core of the roll of sheet material, the guide generally restricts movement of the saw blade along a radius 116 of the roll of sheet material. Thus, movement of the saw blade along the guide and toward the core anchor enables the sheet material to be cut. In this manner, damaged portions of the sheet material and/or core can be trimmed from the roll.

Note also in FIG. 1 that the end 118 of the roll of sheet material has been scored, such as with a circular saw, to exhibit groove 120. Scoring typically is accomplished prior to trimming the roll so that portions of the sheet material that are separated from the roll by the cutting tool fall away from the roll. In particular, the portions fall away from the roll in the form of ribbons 122. As these ribbons are removed, the saw blade can be moved closer to the core for cutting inner portions of the sheet material.

Figure 2:
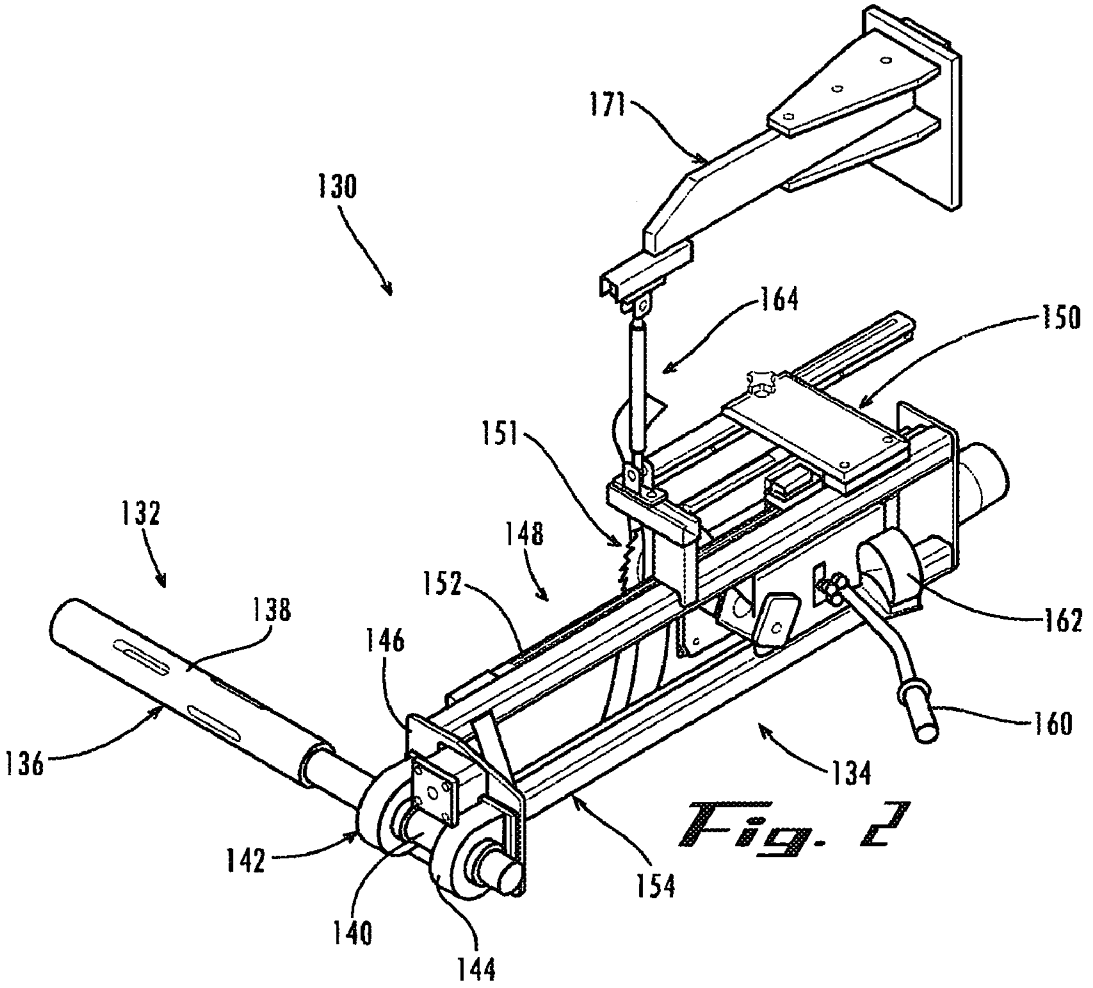
FIG. 2 is a perspective view of an embodiment of a core anchor and cutting tool.

An embodiment of a roll-trimming assembly that can be used in a system for trimming rolls of sheet material is depicted in FIGS. 2-5. As shown in FIG. 2, roll-trimming assembly 130 includes a core anchor 132 and a cutting tool 134. In this embodiment, the core anchor is generally configured as a shaft 136 that includes a first portion 138, which is adapted to be removably secured within a hollow core of a roll of sheet material, and a second portion 140, which is configured to facilitate attachment of the cutting tool.

Attachment of the cutting tool 134 to the core anchor 132 is facilitated by first and second bushings 142, 144. The bushings are spaced from each other and mounted to a mounting plate 146. The mounting plate is affixed to a guide 148 that facilitates movement of the cutting tool both toward and away from the core anchor. In this embodiment, the guide is a dual-tracked rail assembly that is engaged by a carriage 150. Specifically, the guide incorporates rails 152, 154 that are spaced from each other and which extend outwardly from the mounting plate.

Figure 3:
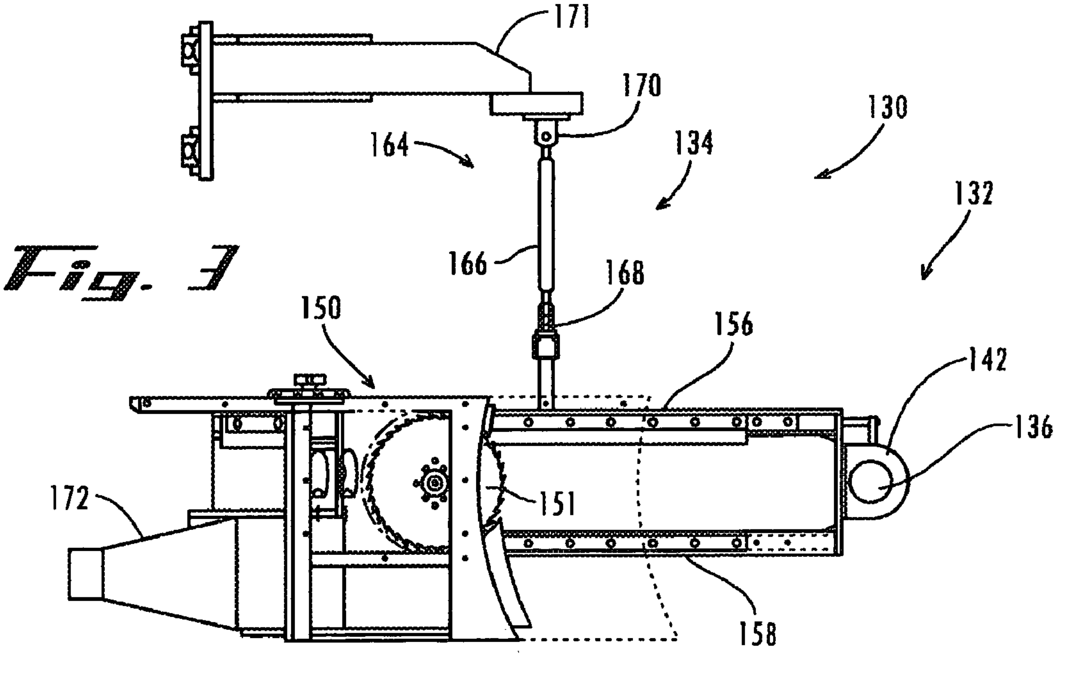
FIG. 3 is a rear view of the embodiment depicted in FIG. 2.

As best shown in FIG. 3, each rail incorporates a toothed track 156, 158 that is engaged by the carriage for permitting the carriage to advance incrementally along the guide. The carriage 150 is configured to move along the tracks of the guide using gears (not shown) so that the cutting tool, which in this case includes a circular saw blade 151, can be moved toward the core anchor 132 during a trimming operation. Movement of the carriage along the guide is facilitated by an operator grasping handles 160, 162 (FIG. 2) and urging the carriage in an intended direction of travel, such as between the positions indicated in FIG. 3. In other embodiments, the carriage can be automatically driven with a gear system.

The guide 148 is suspended from a support member 164. The support member generally supports the weight of the guide and carriage while enabling the cutting tool to match the non-rotational movement of a rotating roll of sheet material to which the core anchor 132 is secured. In this embodiment, the support member includes a support linkage 166 that is mounted between brackets 168, 170, bracket 168 being attached to the guide. The brackets allow the support linkage to pivot in various directions thereby supporting the cutting tool in a variety of orientations. Bracket 170 of the support member is attached to a frame member 171, which will be described in detail later.

In other embodiments, various other types of support members can be used. By way of example, a chain can be used, such as a chain extending between the frame member and the guide.

Figure 4:
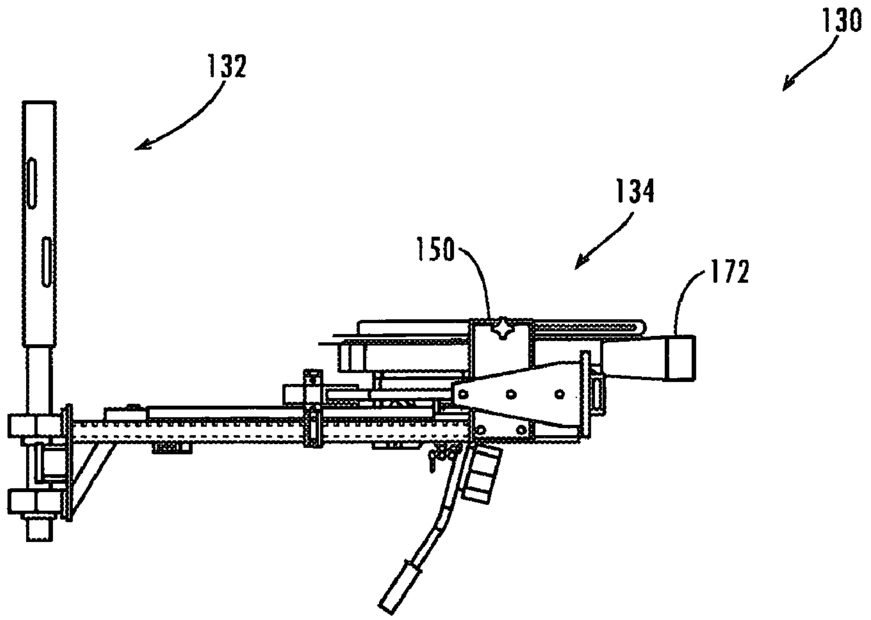
FIG. 4 is a top view of the embodiment depicted in FIGS. 2 and 3.
Figure 5:
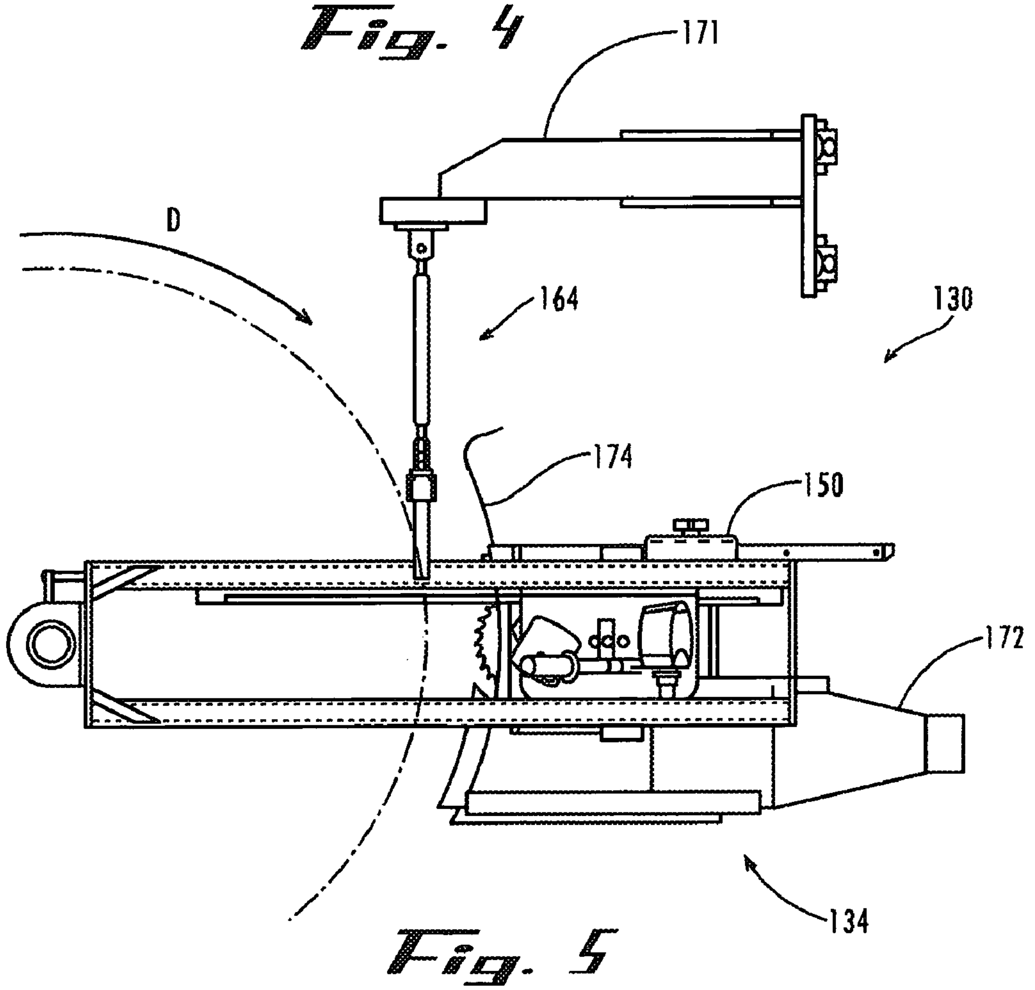
FIG. 5 is a front view of the embodiment depicted in FIGS. 2-4, with a representative roll of sheet material being shown in phantom lines.

As shown in FIGS. 3-5, a vacuum nozzle 172 is attached to the carriage 150. The vacuum nozzle is used to draw dust and/or other particles produced during a trimming operation away from the cutting tool. Use of the vacuum nozzle tends to prevent fouling of the cutting tool, and can significantly reduce the amount of dust that would otherwise spread from the area of the trimming operation. Since such a trimming operation can take place on-site, i.e. at a facility where the rolls of sheet material are used for manufacturing products, the ability to reduce errant dust can be quite desirable.

As shown most clearly in FIG. 5, the carriage 150 includes a ribbon guard 174 that extends generally upwardly and outwardly from the cutting tool. In particular for this embodiment, the ribbon guard extends away from the cutting tool in a direction that generally opposes the intended direction of rotation (indicated by arrow D) of the roll sheet material that is to be trimmed. So configured, the ribbon guard can deflect ribbons of sheet material that are cut away from the roll so that the cutting tool does not become obstructed by the ribbons.

Figure 6:
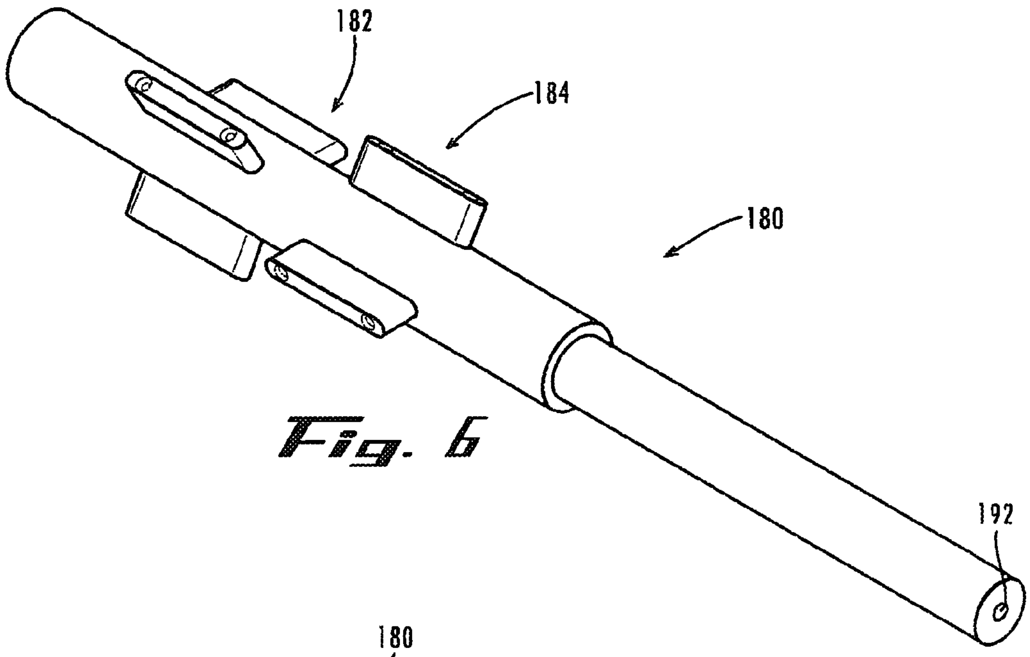
FIG. 6 is a perspective view of an embodiment of a shaft including a core anchor.

Another embodiment of a core anchor is depicted schematically in FIG. 6. As shown in FIG. 6, core anchor 180 is generally configured as a shaft. The core anchor includes a set of lugs, each of which moves with respect to the shaft. In particular, this embodiment includes two sets of lugs 182, 184, with each set including three lugs for a total of six. Each of the lugs within a set are angularly displaced from an adjacent lug by approximately 120°. Additionally, the lugs of set 182 are offset with respect to the lugs of set 184 such that, as viewed from an end of the shaft, there is a lug located at approximately each 60° interval about a circumference of the core anchor.

Figure 7:
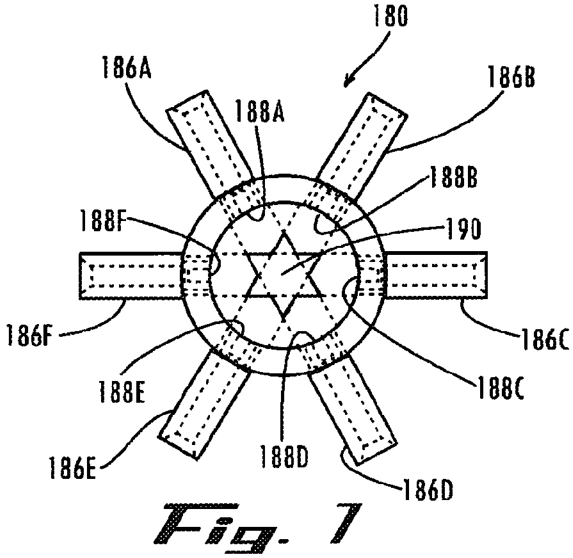
FIG. 7 is a schematic end view of an embodiment of a core anchor showing the lugs in a retracted position.
Figure 8:
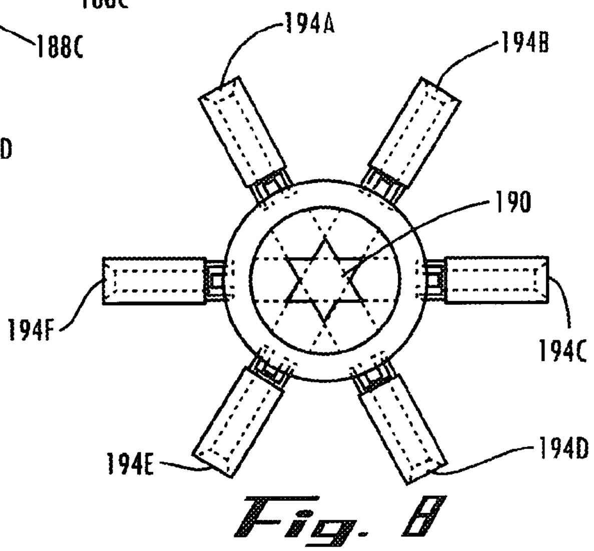
FIG. 8 is a schematic end view of the embodiment of FIG. 7 showing the lugs in an extended position.

As shown in greater detail in FIGS. 7 and 8, the lugs 186A-F are adapted to move from retracted positions (FIG. 7) to extended positions (FIG. 8) for securing the core anchor within a hollow core of a roll of sheet material. Specifically, inner surfaces 188A-F of the lugs pneumatically communicate with an air manifold 190 located within the shaft. When sufficient air pressure is provided to the air manifold, such as via fitting 192 (FIG. 6), the lugs are forced radially outwardly to their extended positions. In the extended positions, outer end surfaces 194A-F of the lugs engage corresponding portions of the inner surface of the hollow core of the roll into which the core anchor has been inserted. It should be noted that, although the embodiment depicted in FIGS. 6-8 uses pneumatically actuated lugs, various other forms of actuation, such as hydraulic, can be used.

In some embodiments, the lugs can be adapted to accommodate various inner diameters of cores. This can be accomplished by providing removable lugs of various sizes that can be changed based on the size of the core into which the core anchor is to be inserted. For instance, a shaft using shorter lugs than those depicted in FIG. 6 is shown in FIG. 2. Additionally or alternatively, each lug can be adapted to mate with a lug extension for effectively changing the size of the lug. Clearly, various sizes, shapes, numbers and arrangements of lugs, other than those shown in FIGS. 6-8, can be used in other embodiments.

Figure 9:
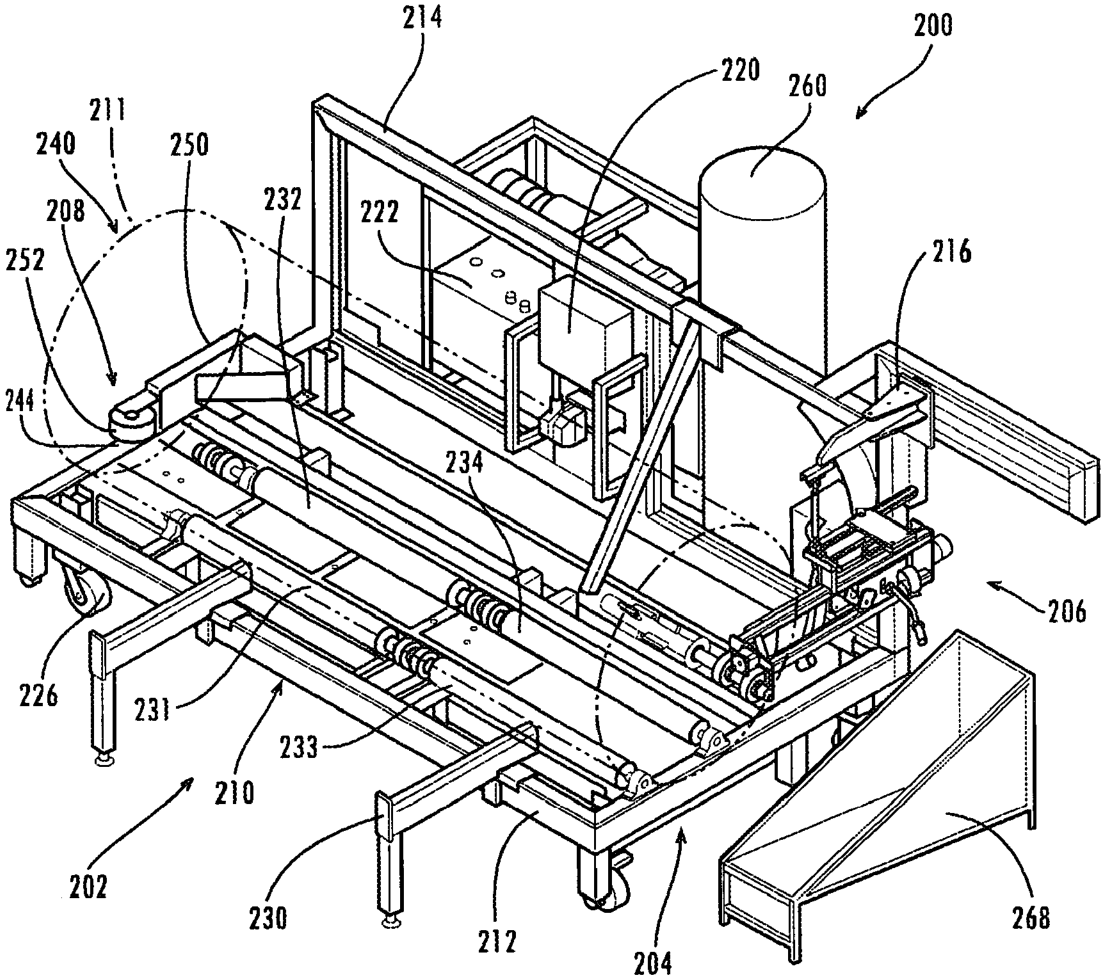
FIG. 9 is a perspective view of another embodiment of a system for trimming a roll of sheet material, with a representative roll of sheet material mounted thereon shown in phantom lines.
Figure 10:
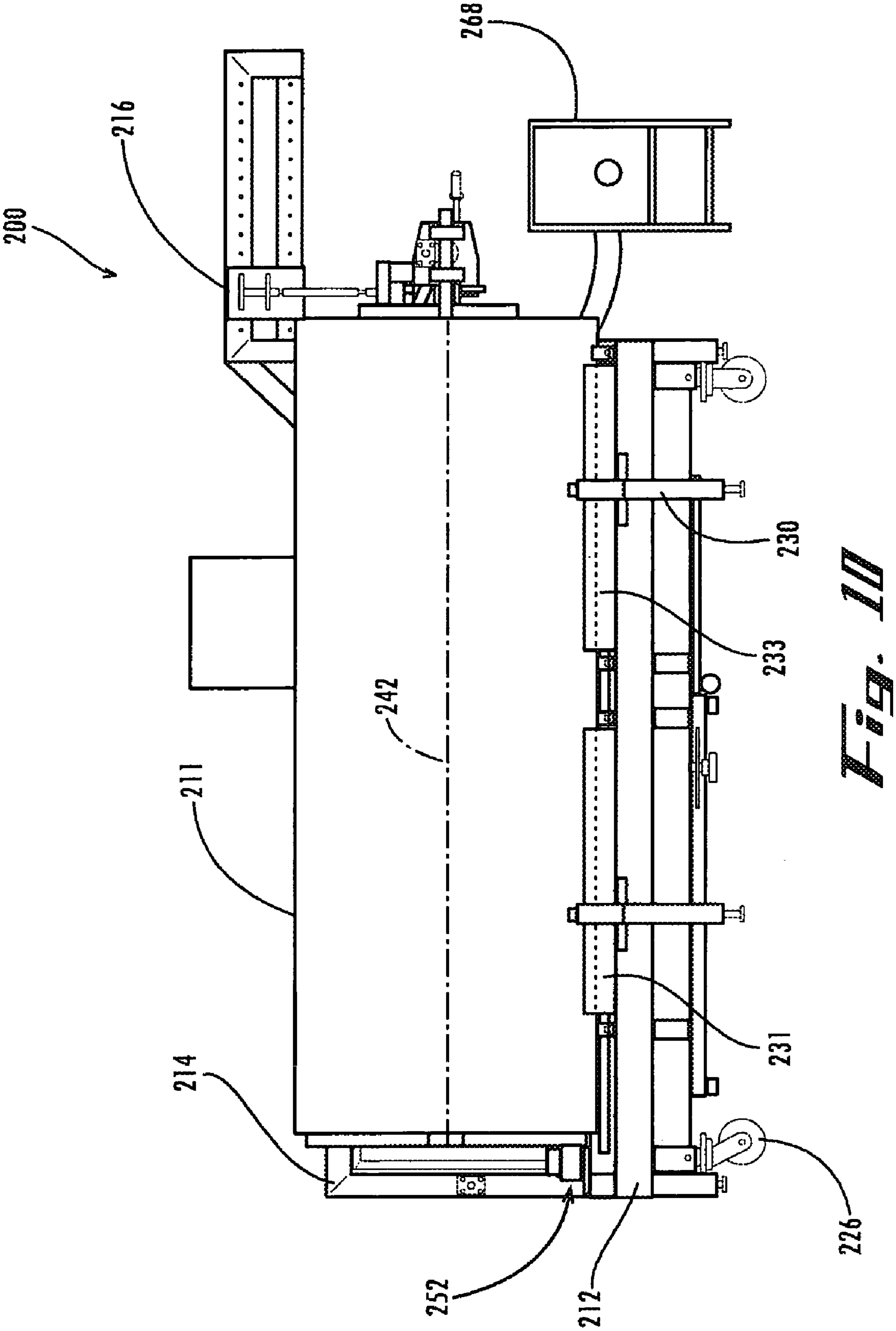
FIG. 10 is a front view of the embodiment depicted in FIG. 9, with a representative roll of sheet material mounted thereon shown in phantom lines.
Figure 11:
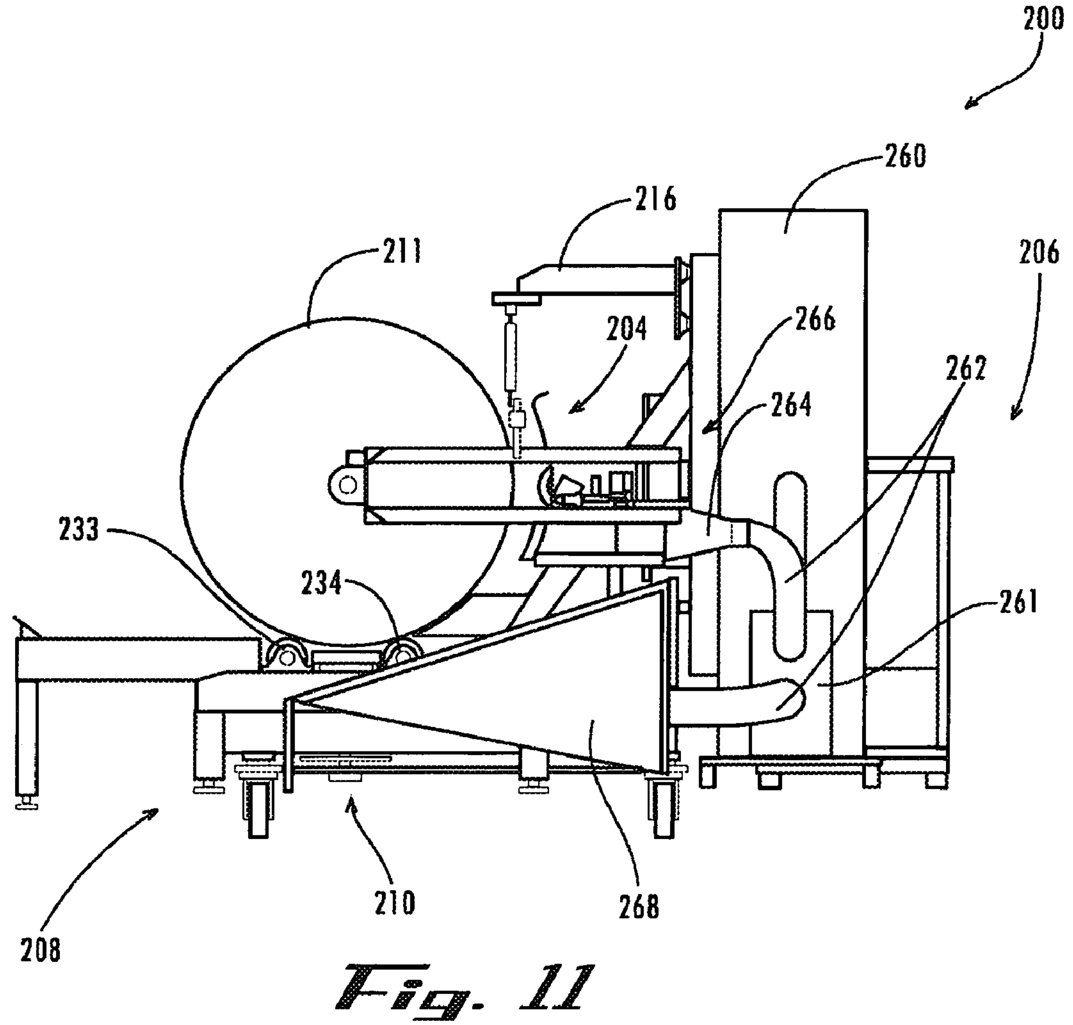
FIG. 11 is an end view of the embodiment depicted in FIGS. 9 and 10, with a representative roll of sheet material mounted thereon shown in phantom lines.
Figure 12:
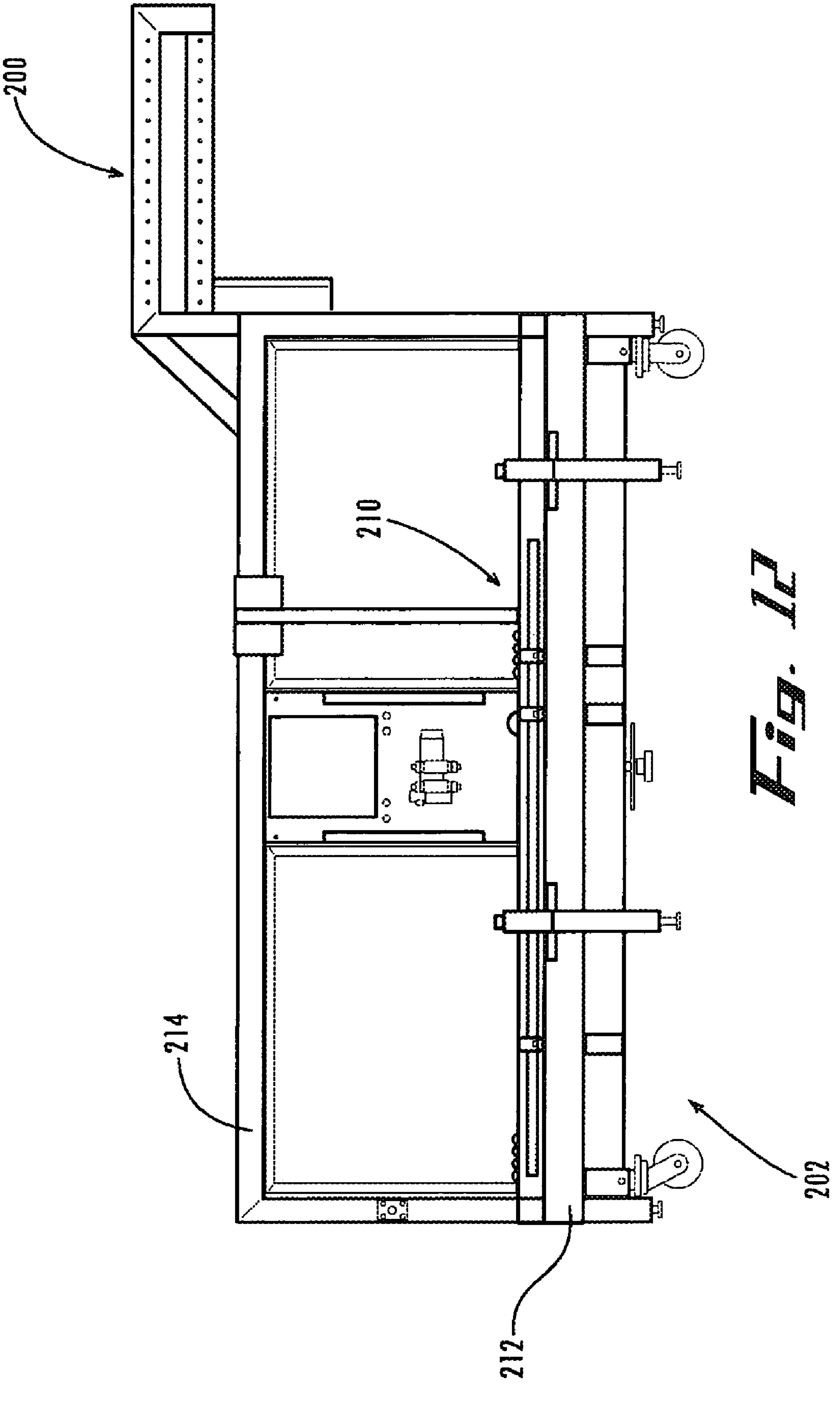
FIG. 12 is a front view of the embodiment depicted in FIGS. 9-11, with the roll of sheet material removed.

Another embodiment of a system for trimming a roll of sheet material is depicted schematically in FIGS. 9-12. As shown in FIG. 9, system 200 comprises a frame assembly 202, a roll-trimming assembly 204, a dust-collecting assembly 206, a roll-stabilizing assembly 208 and a roll-positioning assembly 210. Note, a roll of sheet material 211 is positioned on the system for trimming (depicted in phantom lines).

In the embodiment of FIGS. 9-12, frame assembly 202 includes a generally rectangular base frame 212 and a support frame 214. The support frame extends upwardly from the base frame and is used to mount a frame member 216 for suspending the roll-trimming assembly. Various other assemblies and/or components also are mounted to the support frame, such as an electrical sub-assembly 220. Note that an hydraulic sub-assembly 222 (the pump of which is powered by the electrical sub-assembly) and a pneumatic sub-assembly (not shown) are not attached to the frame in this embodiment.

An underside of the base frame 212 incorporates wheels, such as wheel 226, to permit movement of the entire system. Notably, the system 200 is sized for transport by vehicle so that the system can be delivered on-site for performing trimming operations.

Additionally, the embodiment of FIG. 9 incorporates removable legs, such as leg 230, that can be installed for provided extra support to the frame and removed for transport.

Frame assembly 202 also supports a set of rollers 231-234. The rollers are used to support and rotate a roll 240 of sheet material that is to be trimmed. Specifically, the rollers support the roll in a substantially horizontal orientation and rotate the roll about a longitudinal axis 242. Note that, although this embodiment uses four rollers, various other numbers and arrangements of rollers can be used. Additionally, in this embodiment, there are only two drive rollers. That is, only rollers 232 and 334 are driven by a motor 244 for rotating the roll. Note that the motor in this embodiment is an hydraulic motor controlled by the hydraulic sub-assembly 222.

The roll-stabilizing assembly 208 is attached to the base frame. The roll-stabilizing assembly includes a movable support arm 250 and a wheel 252. Specifically, the support arm is configured to move along a length of the base frame to accommodate various lengths of rolls of sheet material. The wheel is attached to and positioned by the support arm so that the wheel contacts the end of the roll of sheet material that is to be trimmed. In this position, the roll-stabilizing assembly tends to maintain a longitudinal position of the roll of sheet material upon the set of rollers. Thus, the roll does not back away from the cutting tool during trimming. Notably, the wheel turns as the roll of sheet material is rotated.

The dust-collecting assembly 206 includes a vacuum 260 with an integrated filter. A vacuum duct 262 extends from the vacuum to a vacuum nozzle 264, which is located in a vicinity of the cutting tool 266. The vacuum duct also extends to a dust collection bin 268 that is located beneath the cutting tool. So provided, the dust collection bin and the vacuum nozzle collect dust and/or other particles due to the flow of air created by vacuum 260.

Figure 13:
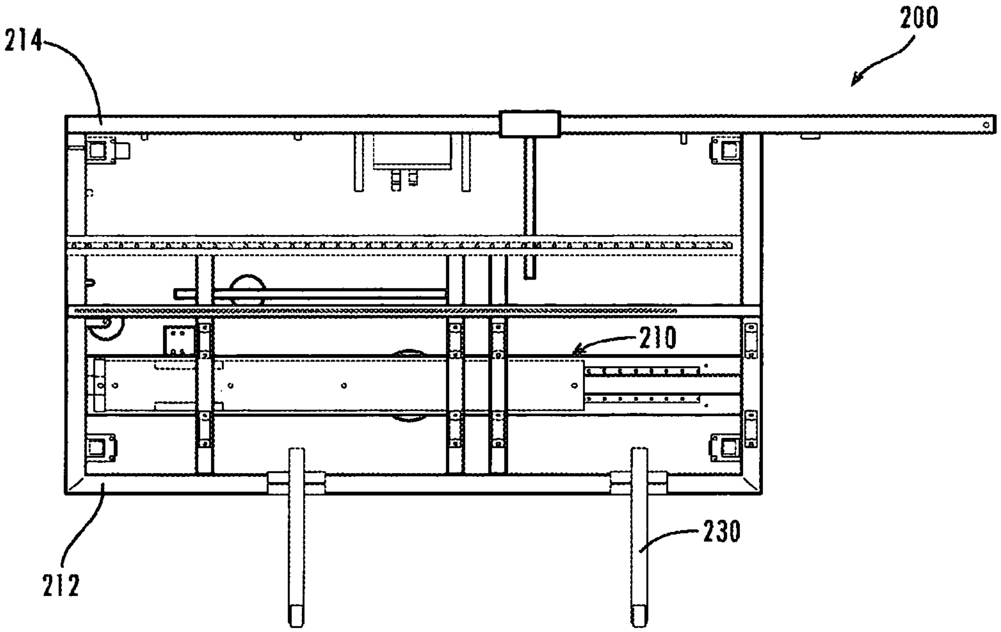
FIG. 13 is a top view of the embodiment depicted in FIGS. 9-12, with the roll of sheet material removed.

As shown best in FIG. 13 (in which various components such as the rollers are removed), the roll-positioning assembly 210 is located to be between the rollers. The roll-positioning assembly is used to position a roll of sheet material so that the roll is properly oriented upon the frame assembly for trimming.

Figure 14:
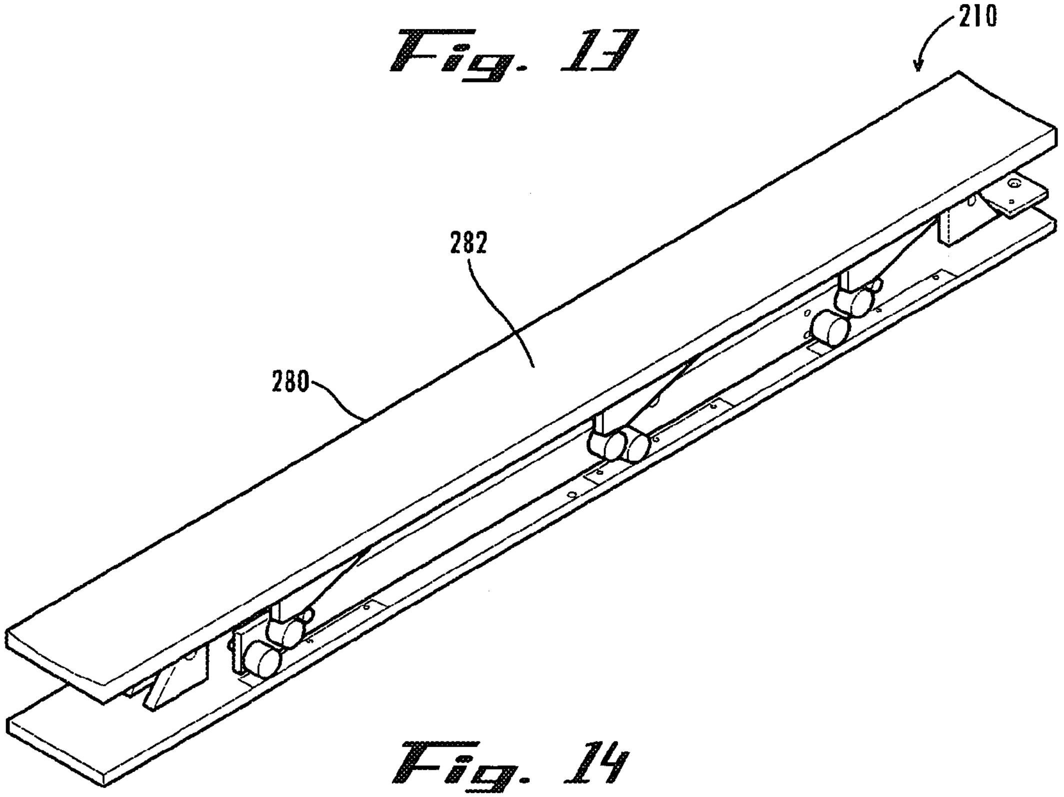
FIG. 14 is a schematic diagram depicting an embodiment of a roll-lifting assembly.

As shown in FIG. 14, this embodiment of the roll-positioning assembly includes a roll cradle 280 that has an upper surface 282 for engaging an outer surface of the roll sheet material. The roll cradle is hydraulically actuated by components located beneath the roll cradle. In operation, the roll cradle can be moved vertically and/or horizontally. Thus, the combination of vertical lifting of the roll and horizontal displacement of the roll enables the roll-positioning assembly to position a roll of sheet material properly upon the rollers.

In order to perform trimming of a roll of sheet material using a system, such as one of the embodiments depicted herein, a roll of sheet material is positioned in a substantially horizontal orientation. The end of a rotatable shaft to which a cutting tool is rotatably attached is secured within the hollow core of the roll. Notably, the cutting tool rotates within a plane perpendicular to a longitudinal axis of the shaft. The roll of sheet material is then rotated while the end of the shaft is secured within the hollow core so that the shaft rotates with the roll, and while maintaining the roll in the substantially horizontal orientation. The sheet material is then cut with the cutting tool. Optionally, the cutting tool can be replaced by an abrading tool, such as an abrasive disk, and the end of the roll that has been trimmed can be smoothed by the abrading tool.

It should be emphasized that many variations and modifications may be made to the above-described embodiments. All such modifications and variations are intended to be included herein within the scope of this disclosure and protected by the following claims.

The invention claimed is:

1. A system for trimming a roll of sheet material, the sheet material being wound around a hollow core, said system comprising:

a core anchor configured to be inserted into the hollow core of a roll of sheet material and removably secured therein;

a cutting tool rotatably attached to said core anchor;

a frame, said cutting tool being supported by said frame; and a roller mounted to said frame, said roller being operative to rotate the roll of sheet material with the roll being oriented in a substantially horizontal position;

wherein, during trimming of a roll of sheet material to which said core anchor is secured:

said roller is operative to rotate the roll relative to said frame such that said core anchor rotates with the roll; and said cutting tool is operative to move within a plane oriented perpendicular to a longitudinal axis of said core anchor.

2. The system of claim 1, wherein said cutting tool is suspended from said frame.

3. The system of claim 1, wherein the roller is a first roller of a pair of rollers mounted to said frame, said pair of rollers being operative to roll thereon the roll of sheet material oriented in the substantially horizontal position.

4. The system of claim 3, further comprising:

a roll lift assembly mounted to said frame, said roll lift assembly having a cradle operative to move between said pair of rollers and engage an outer surface of a roll of sheet material such that the roll of sheet material can be lifted off of said pair of rollers.

5. The system of claim 1, further comprising:

a guide rotatably mounted to said core anchor, said cutting tool being movably mounted to said guide such that movement of said cutting tool along said guide changes a distance between said cutting tool and said core anchor.

6. The system of claim 5, further comprising:

a carriage, said cutting tool being mounted to said carriage;

wherein said guide has a geared track, said carriage engaging said geared track for directing said cutting tool along said guide.

7. The system of claim 1, wherein said cutting tool comprises a circular saw blade.

8. The system of claim 1, further comprising:

means for removably securing said core anchor within the hollow core.

9. The system of claim 1, wherein said core anchor comprises a shaft and lugs, said lugs being mounted to said shaft and movable between retracted and extended positions such that, in said extended positions, said lugs contact the inner wall of the hollow core to secure said core anchor within the hollow core and, in said retracted positions, said lugs permit removal of said core anchor from said hollow core.

10. The system of claim 9, wherein said lugs are pneumatically actuated to move between said retracted and extended positions.

11. The system of claim 1, further comprising:

a guard located adjacent said cutting tool, said guard being operative to deflect ribbons of sheet material cut from the roll by said cutting tool away from said cutting tool.

12. The system of claim 1, wherein, during trimming of a roll of sheet material to which said shaft is secured, said shaft rotates with the roll as the roll is rotated, with an axial position of said cutting tool relative to the rotating roll being substantially maintained.

13. The system of claim 1, further comprising:

a dust collection system operative to collect dust produced during trimming of a roll of sheet material.

14. The system of claim 1, further comprising:

an hydraulic system operative to rotate the roll of sheet material during trimming.

15. The system of claim 14, further comprising:

an electrical system operative to power said hydraulic system.

16. The system of claim 1, wherein said frame is further operative to support the roll of sheet material being trimmed.

17. A method for trimming a roll of sheet material, the sheet material being wound around a hollow core, said method comprising:

providing:

a core anchor configured to be inserted into the hollow core of a roll of sheet material and removably secured therein;

a cutting tool rotatably attached to the core anchor;

a frame, said cutting tool being supported by the frame; and a roller mounted to the frame, said roller being operative to rotate the roll of sheet material with the roll being oriented in a substantially horizontal position;

positioning a roll of sheet material in a substantially horizontal orientation;

securing, within the hollow core, an end of a rotatable shaft of the core anchor, the cutting tool being rotatably attached to the shaft such that the cutting tool is rotatable, relative to the shaft, within a plane perpendicular to a longitudinal axis of the shaft;

rotating the roll of sheet material relative to the frame with the roller and while the end of the shaft is secured within the hollow core, such that the shaft rotates with the roll and an axial position of the cutting tool relative to the rotating roll is substantially maintained, and while maintaining the roll in the substantially horizontal orientation; and cutting the sheet material with the cutting tool while the roll of sheet material is being rotated and as the cutting tool is moved within a plane oriented perpendicular to a longitudinal axis of the core anchor.

18. The method of claim 17, further comprising:

suspending the cutting tool adjacent an end of the roll of sheet material while cutting the sheet material.

19. The method of claim 17, further comprising:

prior to cutting the sheet material with the cutting tool, scoring an end of the roll to a depth corresponding to an amount of sheet material to be removed by the cutting tool.

* * * * *

UNITED STATES PATENT AND TRADEMARK OFFICE

CERTIFICATE OF CORRECTION

PATENT NO. : 7,640,834 B2
APPLICATION NO. : 11/195045
DATED : January 5, 2010
INVENTOR(S) : Morawiec et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1191 days.

Signed and Sealed this

Sixteenth Day of November, 2010

David J. Kappos
*Director of the United States Patent and Trademark Office*